(12) United States Patent
Cooper et al.

(10) Patent No.: US 8,952,571 B2
(45) Date of Patent: Feb. 10, 2015

(54) EXTENDABLE WIRELESS POWER DELIVERY FOR SMALL DEVICES

(75) Inventors: Emily Cooper, Seattle, WA (US);
Joshua Smith, Seattle, WA (US);
Alanson Sample, Seattle, WA (US);
John C. Neumann, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1071 days.

(21) Appl. No.: 12/940,455

(22) Filed: Nov. 5, 2010

(65) Prior Publication Data

US 2012/0113576 A1    May 10, 2012

(51) Int. Cl.
| H02J 17/00 | (2006.01) |
| H02J 7/00 | (2006.01) |
| G06F 1/16 | (2006.01) |
| G06F 1/26 | (2006.01) |
| H02J 7/02 | (2006.01) |

(52) U.S. Cl.
CPC ............. *H02J 7/0044* (2013.01); *H02J 17/00* (2013.01); *G06F 1/1684* (2013.01); *G06F 1/266* (2013.01); *H02J 7/0054* (2013.01); *H02J 7/025* (2013.01)
USPC ...................................................... 307/104

(58) Field of Classification Search
USPC .......................................... 307/104; 320/108
See application file for complete search history.

(56) References Cited

U.S. PATENT DOCUMENTS

| 4,260,230 | A  * | 4/1981 | Suzuki ......................... 396/301 |
| 8,358,100 | B2 * | 1/2013 | Helfrich ....................... 320/106 |
| 2005/0151511 | A1* | 7/2005 | Chary ........................... 320/127 |
| 2006/0043927 | A1 | 3/2006 | Beart et al. |
| 2009/0106567 | A1 | 4/2009 | Baarman |
| 2010/0045114 | A1 | 2/2010 | Sample et al. |
| 2010/0052811 | A1 | 3/2010 | Smith et al. |
| 2010/0081379 | A1 | 4/2010 | Cooper et al. |
| 2010/0109443 | A1 | 5/2010 | Cook et al. |
| 2010/0194206 | A1* | 8/2010 | Burdo et al. .................. 307/104 |
| 2011/0018360 | A1* | 1/2011 | Baarman et al. ............. 307/104 |
| 2011/0050164 | A1* | 3/2011 | Partovi et al. ................ 320/108 |
| 2014/0203656 | A1* | 7/2014 | Yamaguchi ................... 307/104 |

OTHER PUBLICATIONS

International Search Report and Written Opinion received for PCT Application No. PCT/US2011/059429, mailed on Jun. 1, 2012, 8 pgs.

* cited by examiner

*Primary Examiner* — Fritz M Fleming
(74) *Attorney, Agent, or Firm* — Kacvinsky Daisak Bluni PLLC

(57) ABSTRACT

In various embodiments, an electronic device such as a portable computer has a structure that extends from the device to wirelessly transfer electrical power between itself and an external device. The structure may be placed in a non-extended position when not being used for such power transfer. In some embodiments power transfer may take place in either direction, and may be used for various purposes, such as to provide operational power and/or to charge a battery. The external device may be placed on or near the extended structure for power transfer to take place.

17 Claims, 3 Drawing Sheets

EXTENDABLE WIRELESS POWER DELIVERY FOR SMALL DEVICES

BACKGROUND

The majority of personal computing and communication devices are now powered by batteries, and therefore require a battery charger (which may sometimes also provide operating power when the device is stationary). Common examples are notebook computers and cell phones. If the user is traveling, he or she must carry a separate charger for each device, which can be cumbersome. Wireless chargers, such as those based on induction techniques, can reduce the amount of cabling each charger requires, but do nothing to reduce the number of chargers the user needs to carry or store.

BRIEF DESCRIPTION OF THE DRAWINGS

Some embodiments of the invention may be better understood by referring to the following description and accompanying drawings that are used to illustrate embodiments of the invention. In the drawings.

DETAILED DESCRIPTION

Figure 1:
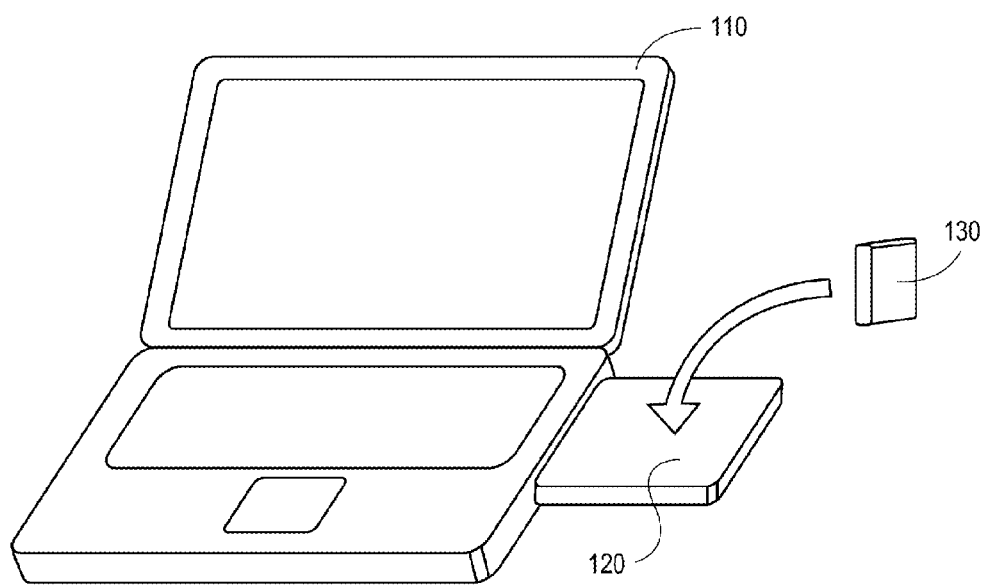
FIG. 1 shows a device with a extendable shelf for wireless battery charging, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a computer-readable medium, which may be read and executed by one or more processors to enable performance of the operations described herein. A computer-readable medium may include any mechanism for storing information in a form readable by one or more computers. For example, a computer-readable medium may include a tangible non-transitory storage medium, such as but not limited to read only memory (ROM); random access memory (RAM); magnetic disk storage media; optical storage media; a flash memory device, etc.

Either of the terms "charger" or "battery charger", as used in this document, refers to a device, circuitry, and/or other components, for replenishing the electrical charge in a rechargeable battery. Either of the terms "wireless charger" or "wireless battery charger" refers to a charger that can accomplish this task without the need for a wired electrical connection between the charger and the device whose battery is being charged. The term "wireless power delivery device", and variations of that term, refer to a device that delivers electrical power from a first device to a second device without the need for a wired electrical connection between the first and second device. That power may be used by the second device for charging a battery and/or for providing operating power. In some cases, the device delivering the power may be obtaining that power from its own battery rather than a wired electrical connection, but that may be fairly irrelevant to the wireless power delivery mechanism, other than the limited amount of power that may be available from the battery.

In various embodiments, wireless battery charging may be accomplished with a structure that extends from a small computer device when used for battery charging, but retracts when not in use. 'Extended', as used in this document, means that at least a portion of the structure is positioned beyond the normal contours of the device, but the structure is still mechanically connected to the device. 'Retracted', as used in this document, means that the structure is either completely or mostly located within the device, and/or is positioned flat against the normal contours of the device. In some embodiments, the extended structure may form a shelf (for example, a structure with the overall form factor of an optical disk drive).

A second device may be placed on or near the extended structure and the battery charged without removing or disconnecting the battery from the device it powers. In some embodiments the battery charger may be in the computer device containing the extendable structure and the battery in the device that is placed on or near that structure. In other embodiments the battery to be charged may be in the computer device and the charger in the device that is placed on/near the structure.

For example, the battery in a cell phone may be charged by placing the cell phone on the shelf. In other embodiments, the cell phone or other device whose battery is to be charged only needs to be placed near the extendable structure, which may or may not have the appearance of a shelf. In another example, the charger device may be placed on or near the extended structure, and the battery in the computer device may be charged.

The electrical power being transferred may be conveyed between the extended structure and the external device through inductive coupling. The device that wirelessly receives the transferred energy may have circuitry to receive the inductive energy and convert that energy into a usable form (for example, a coil or other antenna, a rectifier, a voltage regulator, etc.).

FIG. 1 shows a device with a extendable shelf for wireless battery charging, according to an embodiment of the invention. In the illustrated embodiment, a notebook computer 110 has an extendable structure 120, which may have the general form of a shelf when in the extended position (shown). In some embodiments, this structure may have the form factor of an optical disk drive, and may fit into the same opening, with the same extension and retraction mechanisms, as an optical disk drive. Such devices typically extend horizontally from the side of the notebook computer, as shown, moving in a direction perpendicular to the surface of the side from which the extension occurs. Another device 130, which may be a cell phone or other device, may be placed on the shelf 120, and the recharging circuitry activated. Although a notebook computer has been indicated, device 100 may instead be a netbook computer, a laptop computer, a desktop computer, a notebook computer, a tablet computer, or some other type of computer device.

In some embodiments the structure 120 may contain all or part of the power delivery circuitry. In particular, structure 120 may contain the 'antenna' for wirelessly transmitting the electrical energy, but the remaining circuitry for power delivery may be in the computer device 110 but not in structure 120. In other embodiments the structure 120 may contain an antenna to receive the wireless energy from an external power transmitting device, with additional circuitry in computer device 110 to charge the computer's battery and/or provide operating power to computer 110. In still other embodiments, the structure 120 may contain circuitry for power delivery in both directions (to or from the external device 130), so that device 110 may either deliver power or receive power wirelessly by using structure 120.

Figure 2B:
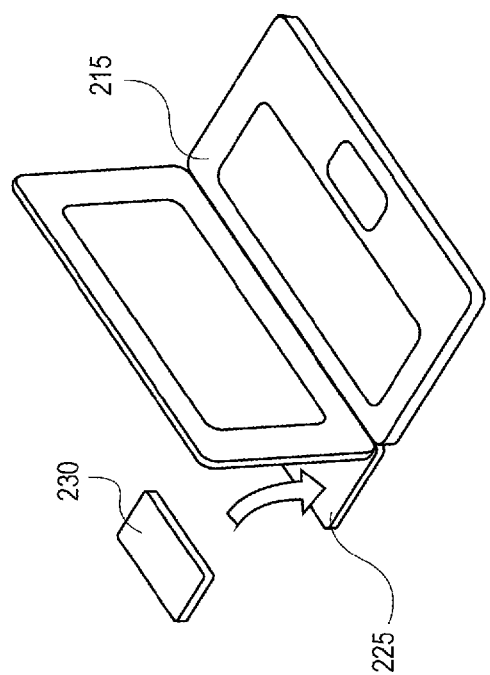
FIGS. 2A, 2B show other devices with an extendable shelf for battery charging, according to an embodiment of the invention.
Figure 2A:
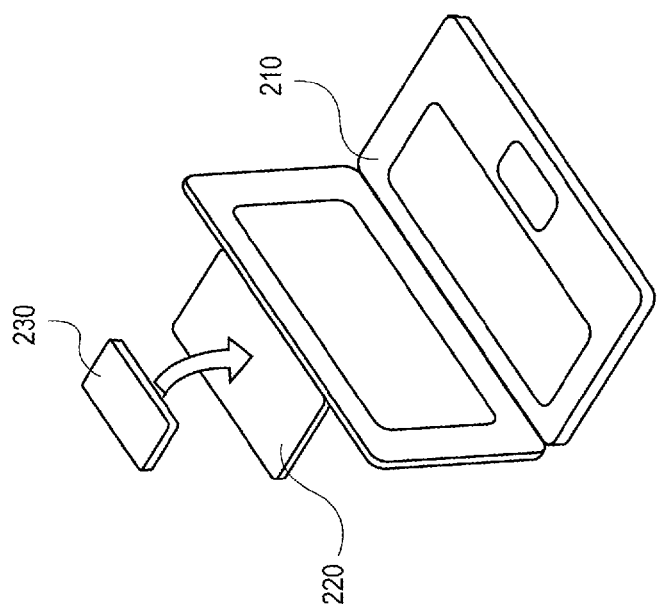

FIGS. 2A, 2B show other devices with an extendable shelf for battery charging, according to an embodiment of the invention. In the illustrated example of FIG. 2A, a portable computer 210 has an extendable structure 220, on which another device 230 may be placed for battery charging. Structure 220 may have a hinged connection at or near the top edge of the lid of device 210, allowing the structure to pivot up to a horizontal position for the charging operation. The term 'lid', as used here, indicates the part of the device 210 containing the display, and that is upright when the device is in a normal usable state, but folds down against the keyboard section for storage or carrying. This is typically the part containing the display, but other embodiments may differ.

When not being used for a charging operation, the structure 220 may rotate back down to lay flat against the lid of device 210, and in some embodiments may rotate into a recessed area be flush with the outer contours of device 210. The structure 220 in the illustration is centered on the top edge of the lid and is not as wide as the lid, but in other embodiments it might not be centered or might be as wide. In other embodiments, extendable structure 220 may be hinged to portable computer 210 closer to the center of the outer surface of the lid, rather than at or near the edge.

In the illustrated example of FIG. 2B, portable computer 215 has an extendable structure 225, on which the other device 230 may be placed for battery charging. Structure 225 may have a hinged connection at or near the bottom edge of the lid, and in some embodiments, this hinged connection may be co-axial with the hinged connection that connects the lid with the keyboard portion of portable computer 215. When not being used for a charging operation, the structure 225 may swivel back against the lid of device 210, and in some embodiments may lay flush against the lid. The structure 225 in the illustration is as wide as the lid and is centered on the lid, but in other embodiments it might not be centered and/or might be narrower. Although the illustrated examples show structures with an overall flat shape, resembling a shelf, this is for example only. Other embodiments may have a structure with any feasible shape. Having a shape that is operationally functional (delivers power efficiently in the desired direction(s), and aesthetically functional (has a form factor that is compatible within the larger device) may generally be a high priority in determining the shape and/or appearance.

Figure 3:
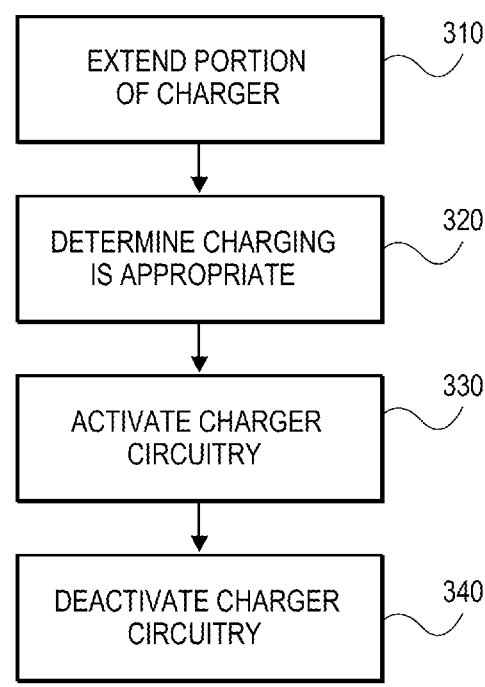
FIG. 3 shows a flow diagram of a method of operating a wireless power transfer system, according to an embodiment of the invention.

FIG. 3 shows a flow diagram of a method of operating a wireless power transfer system, according to an embodiment of the invention. Although written in terms of a wireless battery charger, the same principles apply to wirelessly transferring power for operational use. At 310 the extendable portion of the charger may be extended to its charging position. In some embodiments this may be mechanically performed by the user by pushing, pulling, or pressing the appropriate place on the computer device. In other embodiments this may be done by the computer device itself, in response to a command entered into the computer device. Other techniques may also be used.

At 320 the computer device may determine if it is appropriate to activate the charging circuitry. In some embodiments this may require that the user enter a command or push a button to activate the charging circuitry. In other embodiments this determination may be made when the device determines the extendable portion is in its extended position, either by sensing its position or by activating a command to extend it and assuming the extension took place. In still other embodiments the device may sense the weight of another device on the extended portion, and take that as an indication a device with a rechargeable battery is in position for recharging. Various other approaches may be used instead of, or in addition to, any of these techniques to determine that the charging circuitry should be activated. In some embodiments, power delivery may not be allowed under certain circumstances (e.g., computer 110 is not plugged into an electrical outlet and is operating on battery power, and/or its own battery charge is low). In such instances, the power delivery circuitry may be disabled.

At 330 the charger circuitry may be activated, and charging may take place. When charging has been completed, the charger circuitry may be deactivated at 340. In some embodiments, deactivation may be initiated when the user removes the external device from the extendable portion. In other embodiments deactivation may be initiated by the user entering a command, or pushing a button, or otherwise indicating to the computer device to turn off the charging circuitry. In still other embodiments, the charging circuitry may be deactivated when the extendable portion is retracted. Various other approaches may be used instead of, or in addition to, any of these techniques.

The foregoing description is intended to be illustrative and not limiting. Variations will occur to those of skill in the art. Those variations are intended to be included in the various embodiments of the invention, which are limited only by the scope of the following claims.

What is claimed is:

1. An apparatus comprising:
   a first device comprising a processor, a display, a keyboard, and a wireless power transfer system contained at least partly in a structure, the structure having an extended position to be used when wirelessly transferring power between the first device and an external device and a retracted position to be used when not transferring power between the first device and the external device, and the structure comprising a hinged attachment coupled with a top edge of a lid of the first device and is to be extended from the first device by rotating the structure about the hinged attachment in an upward direction away from the lid when the lid is in an upright position.

2. The apparatus of claim 1, wherein the structure, when extended, forms a shelf on which to set the external device.

3. The apparatus of claim 1, wherein the first device is selected from a list of computers consisting of:
   a) a desktop computer;
   b) a laptop computer;
   c) a notebook computer;
   d) a netbook computer; and
   e) a tablet computer.

4. The apparatus of claim 1, wherein the structure is to extend from the first device in a direction perpendicular to a surface of the first device.

5. The apparatus of claim 1, wherein the structure is to use inductive coupling to transfer power between the first device and the external device.

6. The apparatus of claim 1, wherein the structure is to be used to charge a battery.

7. The apparatus of claim 1, wherein the structure is to be used to transfer power from the first device to the external device.

8. The apparatus of claim 1, wherein the structure is to be used to transfer power from the external device to the first device.

9. The apparatus of claim 1, wherein the structure is to lay in a recessed area of the lid and flush with outer contours of the first device when not in use.

10. A method comprising:
    determining an extendable portion of a wireless power delivery system is in position for wirelessly transferring power to or from an external device;
    determining whether to activate or deactivate charging circuitry for said wirelessly transferring power; and
    prohibiting said wireless transferring power by charging circuitry if a computing device including the wireless power delivery system is operating on battery power.

11. The method of claim 10, activating charging circuitry in response to a push of a button or in response to sensing a weight of the external device.

12. The method of claim 10, activating charging circuitry in response to an entering of a command.

13. The method of claim 10, wherein said determining the extendable position of a wireless power delivery system is in position comprises executing a command to extend the extendable portion.

14. An article comprising a computer-readable non-transitory storage medium that contains instructions, which when executed by one or more processors result in performing operations comprising:
    determining an extendable portion of a wireless power delivery system is in position for wirelessly transferring power;
    determining whether to activate or deactivate charging circuitry for said wirelessly transferring power; and
    prohibiting said wireless transferring power by charging circuitry if a computing device including the wireless power delivery system is operating on battery power.

15. The article of claim 14, comprising the computer-readable non-transitory storage medium that contains instructions, which when executed by one or more processors result in performing operations comprising activating charging circuitry in response to a push of a button or sensing a weight of an external device.

16. The article of claim 14, comprising the computer-readable non-transitory storage medium that contains instructions, which when executed by one or more processors result in performing operations comprising activating charging circuitry in response to an entering of a command.

17. The article of claim 14, wherein said determining the extendable position of a wireless power delivery system is in position comprises executing a command to extend the extendable portion.

\* \* \* \* \*